(12) United States Patent
Kuroda et al.

(10) Patent No.: US 10,609,320 B2
(45) Date of Patent: Mar. 31, 2020

(54) PHOTOELECTRIC CONVERSION DEVICE AND METHOD OF DRIVING PHOTOELECTRIC CONVERSION DEVICE

(71) Applicant: CANON KABUSHIKI KAISHA, Tokyo (JP)

(72) Inventors: Yukihiro Kuroda, Inagi (JP); Yoshikazu Yamazaki, Sagamihara (JP); Kazuhiro Saito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 15/955,132

(22) Filed: Apr. 17, 2018

(65) Prior Publication Data

US 2018/0316884 A1    Nov. 1, 2018

(30) Foreign Application Priority Data

Apr. 28, 2017   (JP) .................................. 2017-089437

(51) Int. Cl.
| | | |
|---|---|---|
| *H04N 5/378* | (2011.01) | |
| *H04N 5/345* | (2011.01) | |
| *H04N 5/3745* | (2011.01) | |
| *H04N 5/232* | (2006.01) | |

(52) U.S. Cl.
CPC ......... *H04N 5/378* (2013.01); *H04N 5/23212* (2013.01); *H04N 5/3454* (2013.01); *H04N 5/3745* (2013.01)

(58) Field of Classification Search
CPC ... H04N 5/378; H04N 5/3454; H04N 5/23212
See application file for complete search history.

(56) References Cited

U.S. PATENT DOCUMENTS

| | | | |
|---|---|---|---|
| 6,839,452 B1 * | 1/2005 | Yang | ........................ H03F 3/082 348/E3.02 |
| 7,528,878 B2 | 5/2009 | Sato et al. | |
| 7,709,869 B2 | 5/2010 | Kuroda | |
| 7,911,521 B2 | 3/2011 | Kuroda et al. | |
| 7,935,995 B2 | 5/2011 | Watanabe et al. | |
| 8,174,599 B2 | 5/2012 | Kuroda et al. | |

(Continued)

FOREIGN PATENT DOCUMENTS

| | | |
|---|---|---|
| JP | 2000-209509 A | 7/2000 |
| JP | 2012-124800 A | 6/2012 |

*Primary Examiner* — Christopher K Peterson
(74) *Attorney, Agent, or Firm* — Venable LLP

(57) ABSTRACT

A photoelectric conversion device includes a pixel region in which pixels are arranged to form rows and columns, control lines each connected to the pixels on a corresponding row, output lines connected to the pixels on a corresponding column, a pixel control unit configured to supply control signals to control the pixels for the control lines, and a signal processing unit configured to select and output a signal output to the output lines. The pixel region includes readout regions each including a block of the pixels arranged on continuous rows and columns, and at least one row includes both of the pixel of the block forming a first readout region and the pixel of the block forming a second readout region. The pixel control unit and the signal processing unit are configured to read out signals of the pixels in a corresponding block sequentially for each of the readout regions.

12 Claims, 7 Drawing Sheets

(56) References Cited

U.S. PATENT DOCUMENTS

| | | |
|---|---|---|
| 8,222,682 B2 | 7/2012 | Watanabe et al. |
| 8,223,238 B2 | 7/2012 | Kuroda et al. |
| 8,345,137 B2 | 1/2013 | Shinohara et al. |
| 8,390,713 B2 | 3/2013 | Kuroda et al. |
| 8,553,118 B2 | 10/2013 | Saito et al. |
| 8,598,901 B2 | 12/2013 | Hiyama et al. |
| 8,670,058 B2 | 3/2014 | Hayashi et al. |
| 8,710,558 B2 | 4/2014 | Inoue et al. |
| 8,711,259 B2 | 4/2014 | Maehashi et al. |
| 8,836,838 B2 | 9/2014 | Nakamura et al. |
| 8,928,786 B2 | 1/2015 | Iwata et al. |
| 8,994,862 B2 | 3/2015 | Kuroda et al. |
| 9,029,752 B2 | 5/2015 | Saito et al. |
| 9,083,906 B2 | 7/2015 | Nakamura et al. |
| 9,118,857 B2 | 8/2015 | Iwata et al. |
| 9,232,165 B2 | 1/2016 | Saito et al. |
| 9,236,406 B2 | 1/2016 | Kuroda |
| 9,305,954 B2 | 4/2016 | Kato et al. |
| 9,337,222 B2 | 5/2016 | Saito et al. |
| 9,357,122 B2 | 5/2016 | Kususaki et al. |
| 9,445,023 B2 | 9/2016 | Kuroda et al. |
| 9,602,753 B2 | 3/2017 | Saito et al. |
| 9,749,570 B2 | 8/2017 | Yamashita et al. |
| 9,762,837 B2 | 9/2017 | Kuroda et al. |
| 9,762,841 B2 | 9/2017 | Yamazaki |
| 9,900,539 B2 | 2/2018 | Yamasaki et al. |
| 2012/0175503 A1 | 7/2012 | Kuroda et al. |
| 2015/0122975 A1 | 5/2015 | Saito et al. |
| 2015/0229815 A1* | 8/2015 | Nonaka ............... H04N 5/2258 348/218.1 |
| 2016/0212366 A1 | 7/2016 | Kuroda |
| 2017/0318253 A1 | 11/2017 | Kuroda et al. |
| 2018/0007297 A1 | 1/2018 | Saito et al. |
| 2018/0007305 A1 | 1/2018 | Yamashita et al. |
| 2018/0084206 A1 | 3/2018 | Saito et al. |
| 2018/0102386 A1 | 4/2018 | Kobayashi et al. |

* cited by examiner

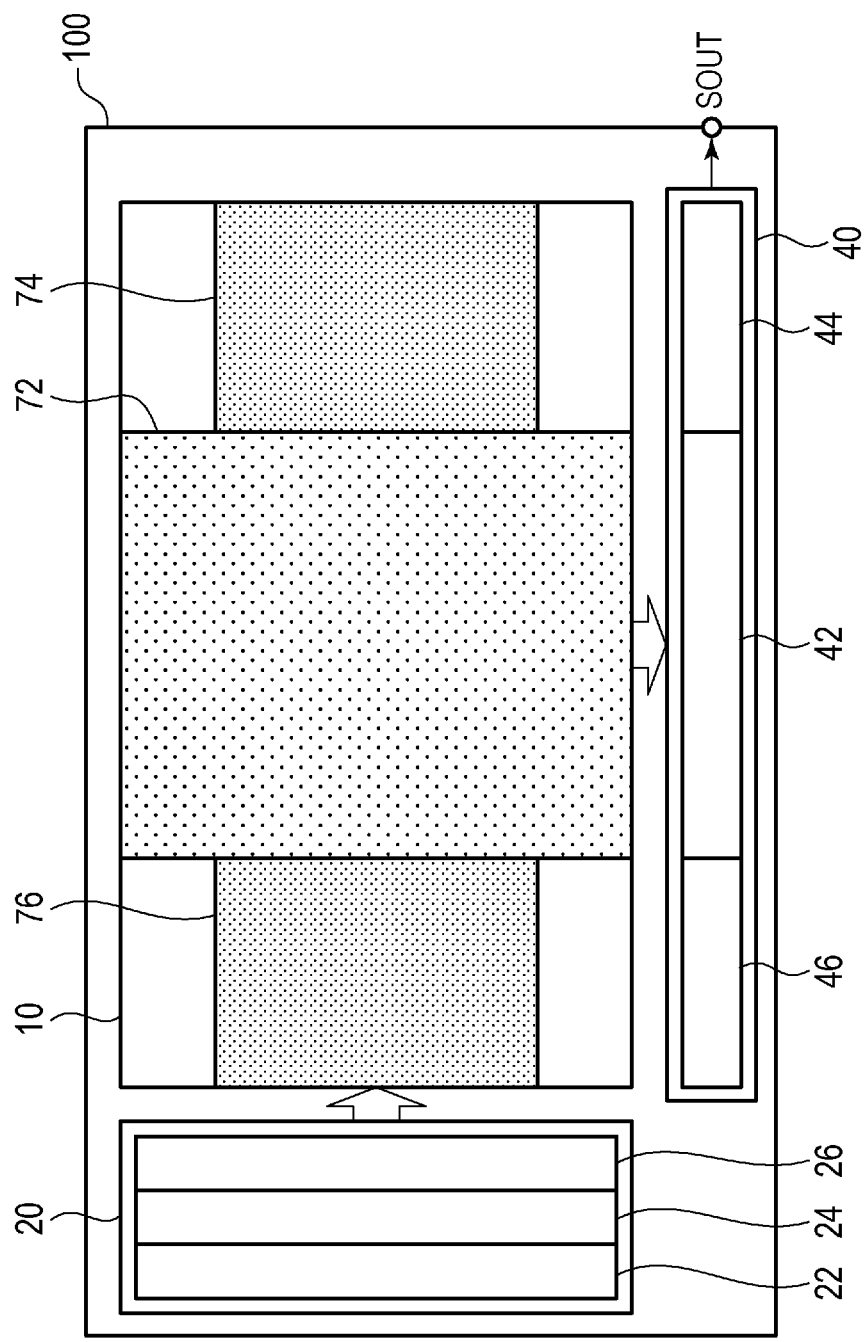

PHOTOELECTRIC CONVERSION DEVICE AND METHOD OF DRIVING PHOTOELECTRIC CONVERSION DEVICE

BACKGROUND OF THE INVENTION

Field of the Invention

The present invention relates to a photoelectric conversion device and a method of driving the same.

Description of the Related Art

X-Y address type photoelectric conversion devices having two-dimensionally arranged photoelectric conversion elements have been widely used as an imaging element of a single-lens reflex digital camera or a video camera. In particular, CMOS photoelectric conversion devices are suitable for higher integration or higher functionality and thus used in other applications than image capturing. As an example, a photoelectric conversion device that performs signal readout suitable for automatic focus detection or automatic exposure detection is known.

Japanese Patent Application Laid-Open No. 2000-209509 discloses a solid-state imaging device that can selectively read out signals from photoelectric conversion elements of a region required for automatic exposure (AE) or automatic focus (AF). Further, Japanese Patent Application Laid-Open No. 2012-124800 discloses an imaging device that divides pixels to be read out into a plurality of groups and performs readout on a group basis.

In the solid-state imaging device disclosed in Japanese Patent Application Laid-Open No. 2000-209509, however, when signals from photoelectric conversion elements of a plurality of regions are read out and when these regions share rows, there is a limitation in high speed readout of a particular region because selection and readout of rows are simultaneously performed. Further, it is not possible to control accumulation of the photoelectric conversion elements on a region basis. Further, in the imaging device disclosed in Japanese Patent Application Laid-Open No. 2012-124800, while readout is performed on a divided-group basis, no consideration has been made for a case where these groups share rows.

SUMMARY OF THE INVENTION

An object of the present invention is to provide a photoelectric conversion device and a method of driving the same that can improve flexibility in setting of readout regions within a pixel region and controllability of readout on a readout region basis.

According to an aspect of the present invention, there is provided a photoelectric conversion device including a pixel region in which a plurality of pixels each including a photoelectric converter are arranged to form a plurality of rows and a plurality of columns, a plurality of control lines each connected to the pixels arranged on a corresponding row of the plurality of rows, a plurality of output lines each connected to the pixels arranged on a corresponding column of the plurality of columns, a pixel control unit connected to the plurality of control lines and configured to supply control signals to control the pixels for the plurality of control lines, and a signal processing unit connected to the plurality of output lines and configured to select a signal output to the plurality of output lines and output the selected signal, wherein pixel region includes a plurality of readout regions each comprising a block of the pixels arranged on continuous rows and continuous columns, wherein at least one row of the plurality of rows includes both of the pixel of the block forming a first readout region of the plurality of readout regions and the pixel of the block forming a second readout region of the plurality of readout regions, and wherein the pixel control unit and the signal processing unit are configured to read out signals of the pixels in a corresponding block sequentially for each of the readout regions.

According to another aspect of the present invention, there is provided a method of driving a photoelectric conversion device that includes a pixel region including a plurality of pixels arranged to form a plurality of rows and a plurality of columns and each including a photoelectric converter, a plurality of control lines provided on respective of the plurality of rows and each connected to the pixels arranged on a corresponding row of the plurality of rows, and a plurality of output lines provided on respective of the plurality of columns and each connected to the pixels arranged on a corresponding column of the plurality of columns, wherein a plurality of readout regions each formed of a block of the pixels arranged on continuous rows and on continuous columns are defined in the pixel region in which two or more of the readout regions are arranged on at least one row of the plurality of rows, the method includes scanning the control lines and the output lines associated with the readout regions and reading out signals of the pixels in a corresponding block sequentially for each of the readout regions.

Further features of the present invention will become apparent from the following description of exemplary embodiments with reference to the attached drawings.

BRIEF DESCRIPTION OF THE DRAWINGS

FIG. 5 is a block diagram illustrating a configuration example of respective units of the photoelectric conversion device according to the second embodiment.

DESCRIPTION OF THE EMBODIMENTS

Preferred embodiments of the present invention will now be described in detail in accordance with the accompanying drawings.

First Embodiment

A photoelectric conversion device and a method of driving the same according to a first embodiment of the present invention will be described with reference to FIG. 1 to FIG. 3C.

Figure 1:
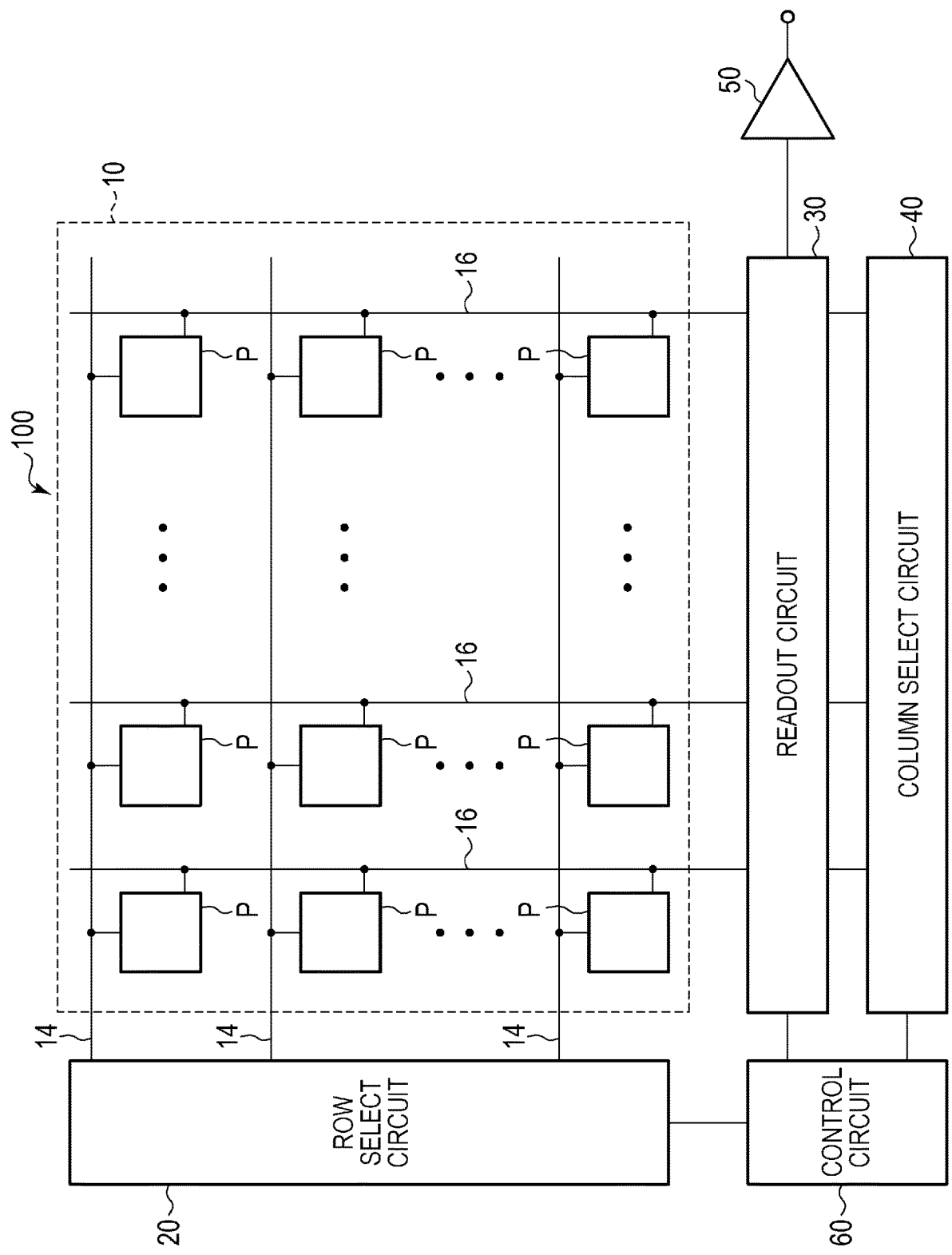
FIG. 1 is a block diagram illustrating a general configuration of a photoelectric conversion device according to a first embodiment.
Figure 2:
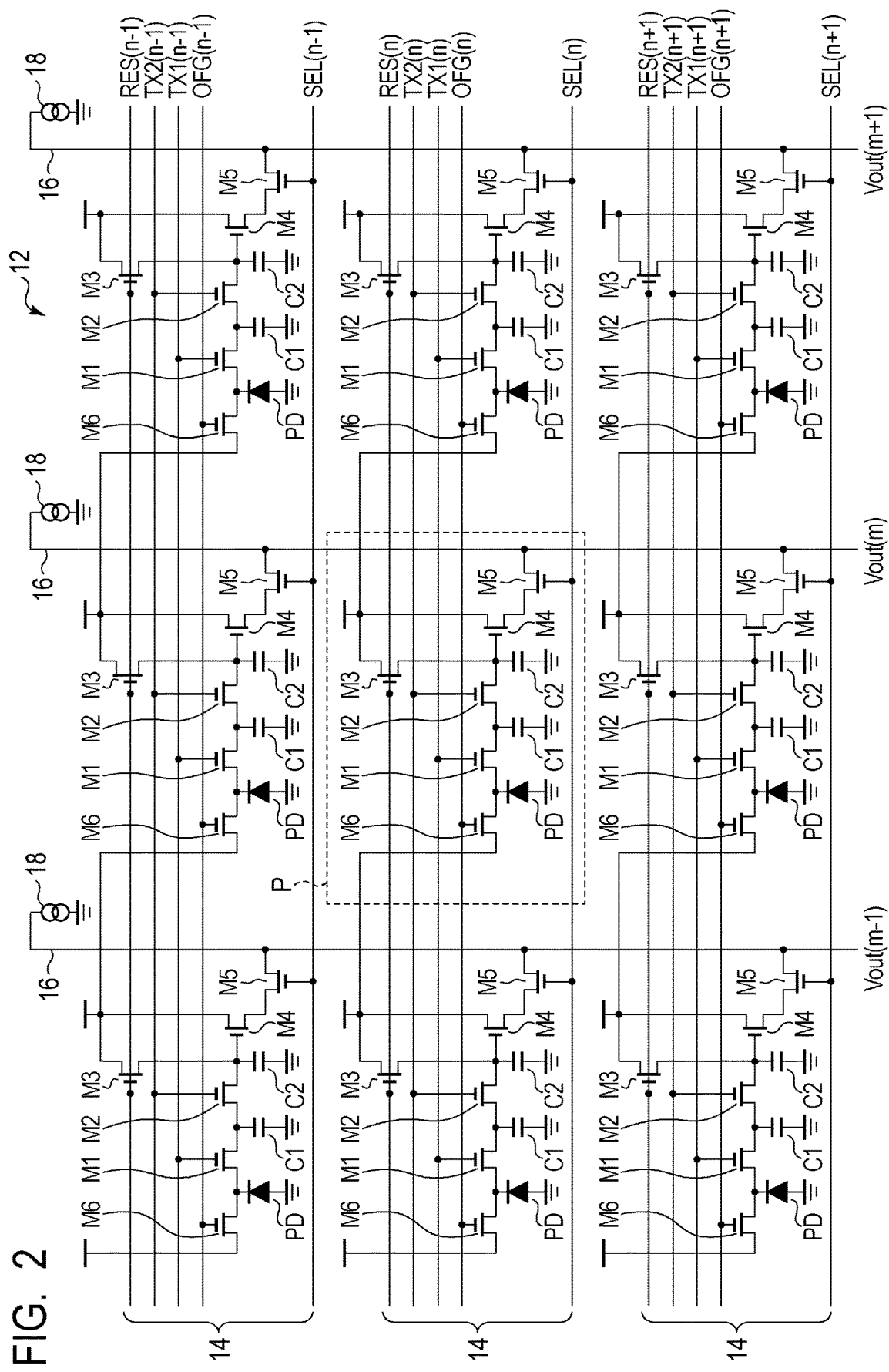
FIG. 2 is a circuit diagram illustrating a configuration example of pixels of the photoelectric conversion device according to the first embodiment.
Figure 3A:
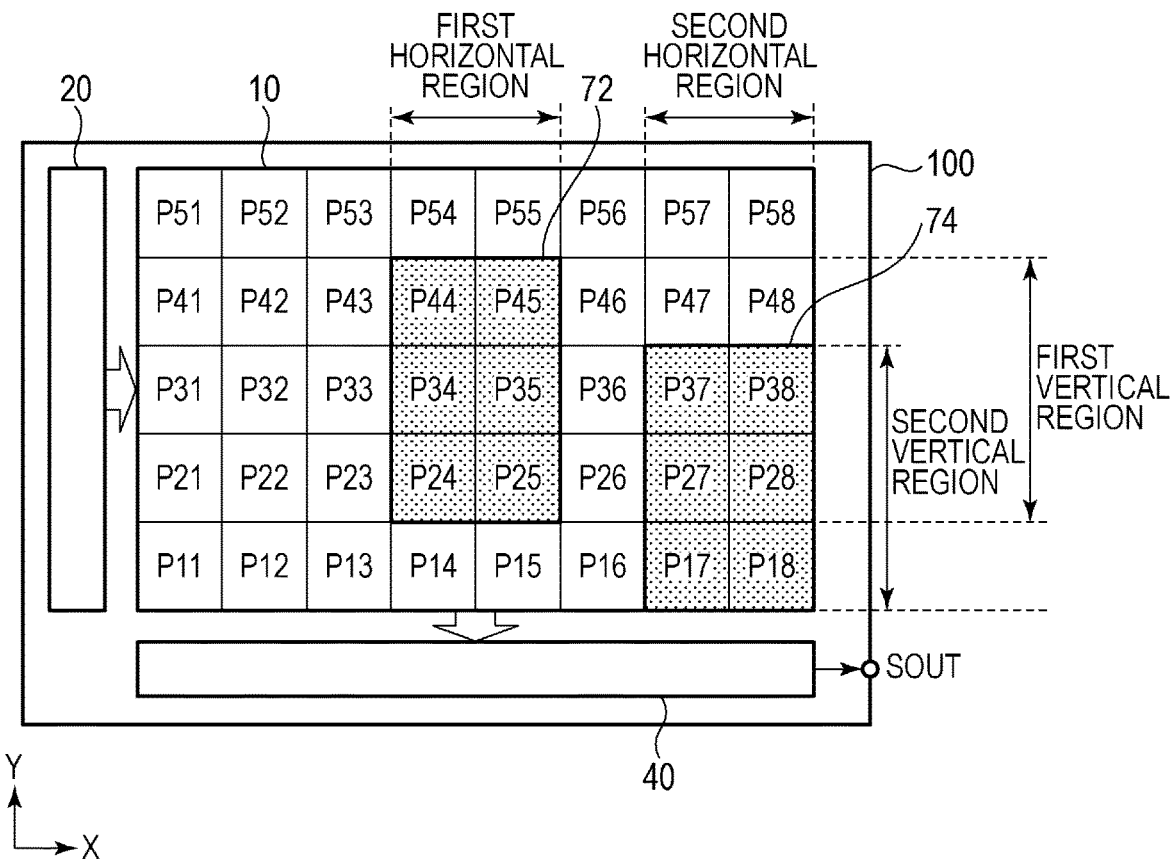
FIG. 3A, FIG. 3B and FIG. 3C are schematic diagrams illustrating a method of driving the photoelectric conversion device according to the first embodiment.
Figure 3B:
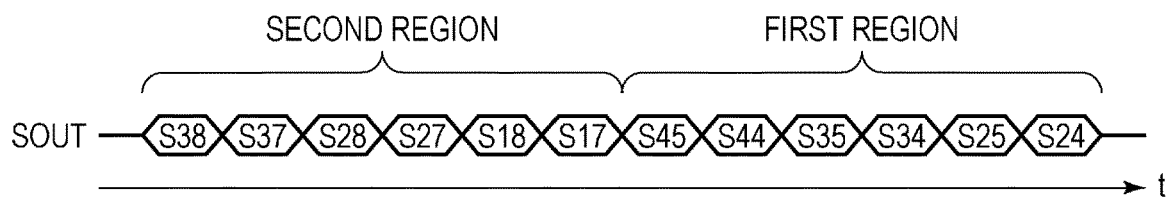
Figure 3C:
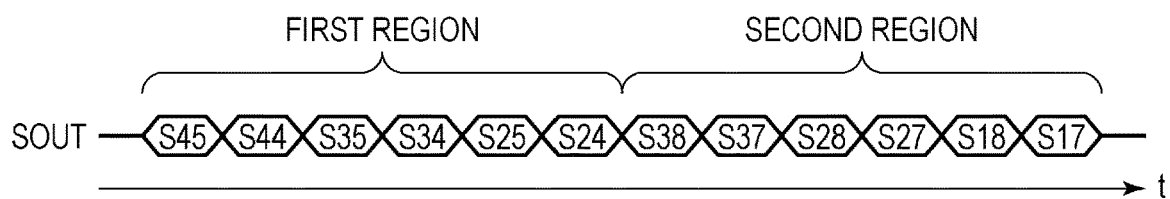

FIG. 1 is a block diagram illustrating a general configuration of the photoelectric conversion device according to the present embodiment. FIG. 2 is a circuit diagram illustrating a configuration example of pixels of the photoelectric conversion device according to the present embodiment. FIG. 3A to FIG. 3C are schematic diagrams illustrating the method of driving the photoelectric conversion device according to the present embodiment.

As illustrated in FIG. 1, a photoelectric conversion device 100 according to the present embodiment includes a pixel region 10, a row select circuit 20, a readout circuit 30, a column select circuit 40, an output circuit 50, and a control circuit 60.

In the pixel region 10, a plurality of pixels P arranged in a matrix over a plurality of rows by a plurality of columns are provided. Each of the pixels P includes a photoelectric conversion element that converts an incident light into charges in accordance with the light amount thereof. The number of rows and the number of columns of a pixel array arranged in the pixel region 10 are not limited in particular.

A control line 14 is arranged on each row of the pixel array of the pixel region 10 and extends in the row direction (horizontal direction in FIG. 1). The control line 14 is connected to the pixels P aligned in the row direction to form a signal line common to these pixels P. Further, an output line 16 is arranged on each column of the pixel array of the pixel region 10 and extends in the column direction (vertical direction in FIG. 1). The output line is connected to the pixels P aligned in the column direction to form a signal line common to these pixels P, respectively.

The control lines 14 on respective rows are connected to the row select circuit 20. The row select circuit 20 is a drive circuit that supplies, to the pixels P via the control lines 14 provided on a row basis of the pixel array, control signals for driving the readout circuit within the pixels P when reading out signals from respective pixels P. The row select circuit 20 can be configured using a shift resistor or an address decoder. Signals read out from the pixels P are input to the readout circuit 30 via the output lines 16 provided on a column basis of the pixel array.

The readout circuit 30 is a circuit unit that performs a predetermined process, for example, a correlated double sampling (CDS) process or signal processing such as an amplification process on signals read out from the pixels P. The readout circuit 30 may include signal holding units, CDS circuits, column amplifiers, or the like.

The column select circuit 40 is a circuit unit that supplies, to the readout circuit 30, control signals used for transferring signals processed in the readout circuit 30 to the output circuit 50 sequentially on a column basis. The column select circuit 40 can be configured using a shift resistor or an address decoder. The output circuit 50 is a circuit unit that is formed of a buffer amplifier or a differential amplifier to amplify and output a signal on a column selected by the column select circuit 40.

Note that, in the present specification, the row select circuit 20 may be referred to as a pixel control unit in focusing the functionality thereof. Further, the readout circuit 30, the column select circuit 40, and the output circuit 50 may be collectively referred to as a signal processing unit.

The control circuit 60 is a circuit unit that supplies control signals to the row select circuit 20, the readout circuit 30, and the column select circuit 40 to control the operation or the timing thereof. Some or all of the control signals supplied to the row select circuit 20, the readout circuit 30, and the column select circuit 40 may be supplied from the outside of the photoelectric conversion device 100.

FIG. 2 is a circuit diagram illustrating an example of pixel circuits forming the pixel region 10. While FIG. depicts nine pixels P arranged in three rows by three columns out of the pixels P forming the pixel region 10, the number of pixels P forming the pixel region 10 is not limited in particular.

Each of the plurality of pixels P includes a photoelectric converter PD, transfer transistors M1 and M2, a reset transistor M3, an amplifier transistor M4, a select transistor M5, and an overflow transistor M6. The photoelectric converter PD is a photodiode, for example. The anode of the photodiode of the photoelectric converter PD is connected to a ground voltage line, and the cathode is connected to the source of the transfer transistor M1 and the source of the overflow transistor M6. The drain of the transfer transistor M1 is connected to the source of the transfer transistor M2. The connection node of the drain of the transfer transistor M1 and the source of the transfer transistor M2 includes a capacitance component and forms a charge holding portion C1. In FIG. 2, the holding portion C1 is represented as a capacitor, one terminal of which is connected to the node. The other terminal of the capacitor forming the holding portion C1 is grounded.

The drain of the transfer transistor M2 is connected to the source of the reset transistor M3 and the gate of the amplifier transistor M4. The connection node of the drain of the transfer transistor M2, the source of the reset transistor M3, and the gate of the amplifier transistor M4 is a so-called floating diffusion (FD) portion. The FD portion includes a capacitance component (floating diffusion capacitor) and forms a charge holding unit C2. In FIG. 2, the holding portion C2 is represented as a capacitor, one terminal of which is connected to the FD portion. The other terminal of the capacitor forming the holding portion C2 is grounded.

The drain of the reset transistor M3, the drain of the amplifier transistor M4, and the drain of the overflow transistor M6 are connected to a power source voltage line (VDD). Note that any two or three of a voltage supplied to the drain of the reset transistor M3, a voltage supplied to the drain of the amplifier transistor M4, and a voltage supplied to the drain of the overflow transistor M6 may be the same, or all of the above may be different. The source of the amplifier transistor M4 is connected to the drain of the select transistor M5. The source of the select transistor M5 is connected to the output line 16.

In the case of the pixel configuration of FIG. 2, each of the control lines 14 arranged in the pixel region 10 includes signal lines TX1, TX2, OFG, RES, and SEL. The signal line TX1 is connected to the gates of the transfer transistors M1 of the pixels P belonging to the corresponding row, respectively, and forms a signal line common to these pixels P. The signal line TX2 is connected to the gates of the transfer transistors M2 of the pixels P belonging to the corresponding row, respectively, and forms a signal line common to these pixels P. The signal line RES is connected to the gates of the reset transistors M3 of the pixels P belonging to the corresponding row, respectively, and forms a signal line common to these pixels P. The signal line SEL is connected to the gates of the select transistors M5 of the pixels P belonging to the corresponding row, respectively, and forms a signal line common to these pixels P. The signal line OFG is connected to the gates of the overflow transistors M6 of the pixels P belonging to the corresponding row, respectively, and forms a signal line common to these pixels P. Note that, in FIG. 2, the corresponding row number is provided to the name of each control line (for example, TX1(n−1), TX1(n), TX1(n+1)).

A control signal that is a drive pulse for controlling the transfer transistor M1 is output to the signal line TX1 from the row select circuit 20. A control signal that is a drive pulse for controlling the transfer transistor M2 is output to the signal line TX2 from the row select circuit 20. A control signal that is a drive pulse for controlling the reset transistor M3 is output to the signal line RES from the row select circuit 20. A control signal that is a drive pulse for controlling the select transistor M5 is output to the signal line SEL from the row select circuit 20. A control signal that is a drive pulse for controlling the overflow transistor M6 is output to the signal line OFG from the row select circuit 20. When each transistor is formed of an n-channel transistor, the corresponding transistor is turned on when supplied with a high-level control signal from the row select circuit 20. Further, the corresponding transistor is turned off when supplied with a low-level control signal from the row select circuit 20.

The output line 16 arranged on each column of the pixel region 10 is connected to the sources of the select transistors M5 of the pixels P aligned in the column direction, respectively, and forms a signal line common to these pixels P. Note that the select transistor M5 of the pixel P may be omitted. In this case, the output line 16 is connected to the sources of the amplifier transistors M4. A current source 18 is connected to each of the output lines 16.

The photoelectric converter PD converts (photoelectrically converts) an incident light into charges in accordance with the light amount thereof and accumulates the generated charges. The overflow transistor M6 resets the photoelectric converter PD to a predetermined potential in accordance with the voltage of the power source voltage line. The transfer transistor M1 transfers charges held in the photoelectric converter PD to the holding portion C1. The holding portion C1 holds charges generated by the photoelectric converter PD in a different location from the photoelectric converter PD. The transfer transistor M2 transfers charges held in the holding portion C1 to the holding portion C2. The holding portion C2 holds charges transferred from the holding portion C1 and sets the voltage of the FD portion, which is also the input node of the amplifier unit (the gate of the amplifier transistor M4), to a voltage in accordance with the capacitance of the holding portion C2 and the amount of the transferred charges. The reset transistor M3 is a reset unit that resets the holding portion C2 to a predetermined potential in accordance with the voltage of the power source voltage line. The select transistor M5 selects the pixels P which output signals to the output lines 16. In the amplifier transistor M4, the drain is supplied with the power source voltage, and the source is supplied with a bias current from the current source 18 via the select transistor M5, which forms an amplifier unit (source follower circuit) whose gate is the input node. Thereby, the amplifier transistor M4 outputs a signal VOUT based on charges generated by an incident light to the output line 16. Note that, in FIG. 2, the corresponding column number is provided to the signal Vout (for example, Vout(m−1), Vout(m), Vout(m+1)).

According to the pixel configuration illustrated in FIG. 2, charges generated by the photoelectric converter PD while the holding portion C1 is holding charges can be accumulated in the photoelectric converter PD. This enables an imaging operation such that exposure periods are matched among the plurality of pixels P, namely, a so-called global electronic shutter operation. Note that electronic shutter means electrically controlling accumulation of charges generated by an incident light.

Next, the method of driving the photoelectric conversion device of the present embodiment will be described by using FIG. 3A to FIG. 3C.

FIG. 3A is a diagram illustrating a configuration example of the pixel region 10 of the photoelectric conversion device according to the present embodiment. While a case where the pixel region 10 is formed of a plurality of pixels P arranged in a matrix of five rows by eight columns will be described as an example here, the number of pixels P forming the pixel region 10 is not limited in particular. In FIG. 3A, each pixel P is represented by a reference of the reference P appended with a row number and a column number. For example, the pixel at the first row and the first column is denoted as the pixel P11, the pixel at the third row and the first column is denoted as the pixel P31, and the pixel at the fifth row and the eighth column is denoted as the pixel P58. Note that, in FIG. 3A, depiction of the readout circuit 30, the output circuit 50, the control circuit 60, and the like is omitted for simplified illustration.

In the method of driving the photoelectric conversion device according to the present embodiment, pixel signals are read out separately from two readout regions (a first readout region 72 and a second readout region 74) defined within the pixel region 10, as illustrated in FIG. 3A. Each of the first readout region 72 and the second readout region 74 is formed of a block comprising a pixel array with continuous rows and columns. FIG. 3A illustrates an example with a case where each of the first readout region 72 and the second readout region 74 is formed of a block comprising a pixel array of three rows by two columns.

The first readout region 72 is a region of the fourth column to the fifth column on the second row to the fourth row. Here, the second row to the fourth row corresponding to positions in the vertical direction of the first readout region 72 is defined as a first vertical region, and the fourth column to the fifth column corresponding to positions in the horizontal direction of the first readout region 72 is defined as a first horizontal region. Also, the second readout region 74 is a region of the seventh column to the eighth column on the first row to the third row. Here, the first row to the third row corresponding to positions in the vertical direction of the second readout region 74 is defined as a second vertical region, and the seventh column to the eighth column corresponding to positions in the horizontal direction of the second readout region 74 is defined as a second horizontal region.

As illustrated in FIG. 3A, while there is no overlapping part between the first horizontal region and the second horizontal region, there is an overlapping part between the first vertical region and the second vertical region. That is, both the first readout region 72 and the second readout region 74 include the second row and the third row. In other words, two or more readout regions are arranged on at least one row of the plurality of rows forming the pixel region 10. Alternatively, both of pixels of a block forming the first readout region of the plurality of readout regions and pixels of a block forming the second readout region of the plurality of readout regions are included in at least one row of the plurality of rows forming the pixel region 10.

The row select circuit 20 and the column select circuit 40 are configured to be able to selectively read out pixel signals of the pixels P belonging to the first readout region 72 and pixel signals of the pixels P belonging to the second readout region 74.

For example, when the row select circuit 20 is configured using a decoder, the control line 14 on the rows associated with either the first readout region 72 or the second readout region 74 can be selectively driven in accordance with input address information. Further, when the row select circuit 20 is configured using a shift resistor, a row select circuit associated with the first readout region 72 and a row select circuit associated with the second readout region 74 can be provided. In any cases, the control line 14 connected to the pixels P of the first readout region 72 and the control line 14 connected to the pixels P of the second readout region 74 are arranged on at least the rows (the second row and the third row) belonging to both the first readout region 72 and the second readout region 74.

Similarly, when the column select circuit 40 is configured using a decoder, signals of the columns associated with either the first readout region 72 or the second readout region 74 can be selectively output in accordance with input address information. Further, when the column select circuit 40 is configured using a shift resistor, a column select circuit associated with the first readout region 72 and a column select circuit associated with the second readout region 74 can be provided. When there is an overlapping part between the first horizontal region and the second horizontal region, two output lines 16 may be arranged on the overlapping column in a similar manner to the case of the control line 14.

With such a configuration of the row select circuit and the column select circuit 40, it is possible to independently control the exposure periods or control the readout operations of pixel signals for the pixels P belonging to the first readout region 72 and the pixels P belonging to the second readout region 74. Further, it is possible to separately output pixel signals of the pixels P belonging to the first readout region 72 and pixel signals of the pixels P belonging to the second readout region 74. Further, any order of performing the readout of pixel signals of the pixels P belonging to the first readout region 72 and the readout of pixel signals of the pixels P belonging to the second readout region 74 may be set.

FIG. 3B and FIG. 3C are conceptual diagrams illustrating the order of output signals SOUT output from the photoelectric conversion device 100 in a temporal manner. In FIG. 3B and FIG. 3C, each of S24, S25, S34, . . . represents the output signal SOUT output from corresponding one of the pixels P. For example, the output signal S24 is the output signal SOUT output from the pixel P24, the output signal S25 is the output signal SOUT output from the pixel P25, and the output signal S34 is the output signal SOUT output from the pixel P34.

FIG. 3B illustrates a case where pixel signals of the pixels P of the first readout region 72 are selectively read out first, and pixel signals of the pixels P of the second readout region 74 are then selectively read out. In the first readout region 72 and the second readout region 74, readout is sequentially performed on a row basis, and the output signals S24, S25, S34, S35, S44, S45, S17, S18, S27, S28, S37, and S38 are output in this order from the photoelectric conversion device 100.

FIG. 3C illustrates a case where pixel signals of the pixels P of the second readout region 74 are selectively read out first, and pixel signals of the pixels P of the first readout region 72 are then selectively read out, in the opposite manner to the case of FIG. 3B. In this case, the output signals S17, S18, S27, S28, S37, S38, S24, S25, S34, S35, S44, and S45 are output in this order from the photoelectric conversion device 100.

In the present embodiment, the row select circuit 20 and the column select circuit 40 are configured to be able to selectively read out image signals of the pixels P in designated readout regions within the pixel region 10 and output the pixel signals from the photoelectric conversion device 100 in a temporal manner on a readout region basis. Therefore, as in the case of the first vertical region and the second vertical region of the first readout region 72 and the second readout region 74, even when vertical regions of readout regions overlap with each other, pixel signals can be output on a readout region basis. Thereby, in applications such as, for example, automatic focus detection that require calculation processing of output signals on a readout region basis, faster operation processing is allowed compared to the case where signal output of a plurality of readout regions sharing rows is performed in a time division manner.

Further, the row select circuit 20 and the column select circuit 40 are configured to be able to switch the readout order of readout regions, as illustrated in FIG. 3B and FIG. 3C. Thereby, a readout region on which operation processing of an output signal is intended to be performed with priority can be initially read out, which enables faster operation processing.

As discussed above, according to the present embodiment, flexibility in setting of readout regions within a pixel region and controllability of readout on a readout region basis can be improved, which enables faster readout of pixels in a particular readout region.

Second Embodiment

Figure 4A:
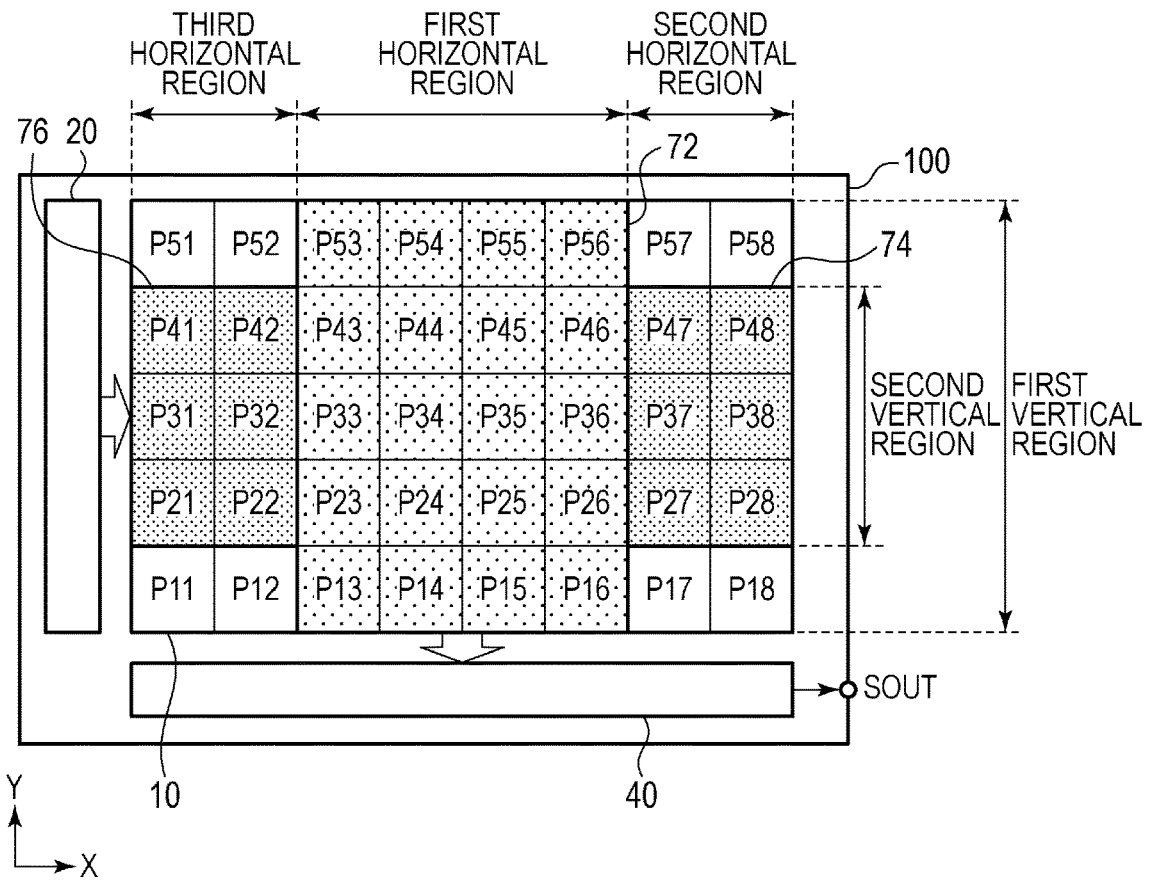
FIG. 4A, FIG. 4B and FIG. 4C are schematic diagrams illustrating a photoelectric conversion device and a method of driving the same according to a second embodiment.
Figure 4B:
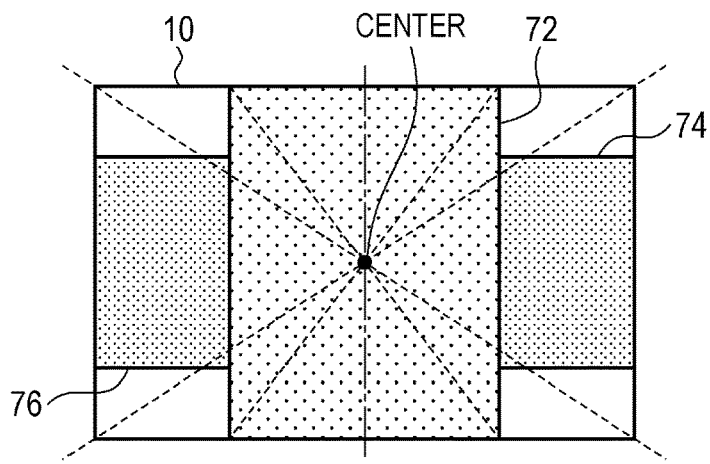
Figure 4C:
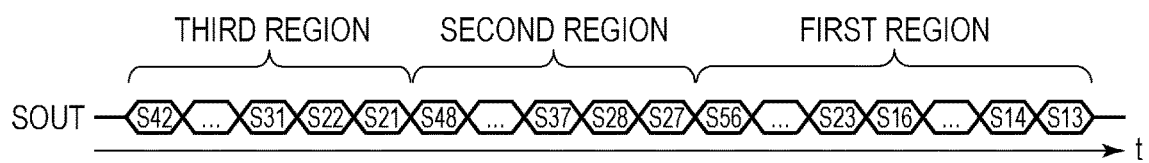
Figure 6:
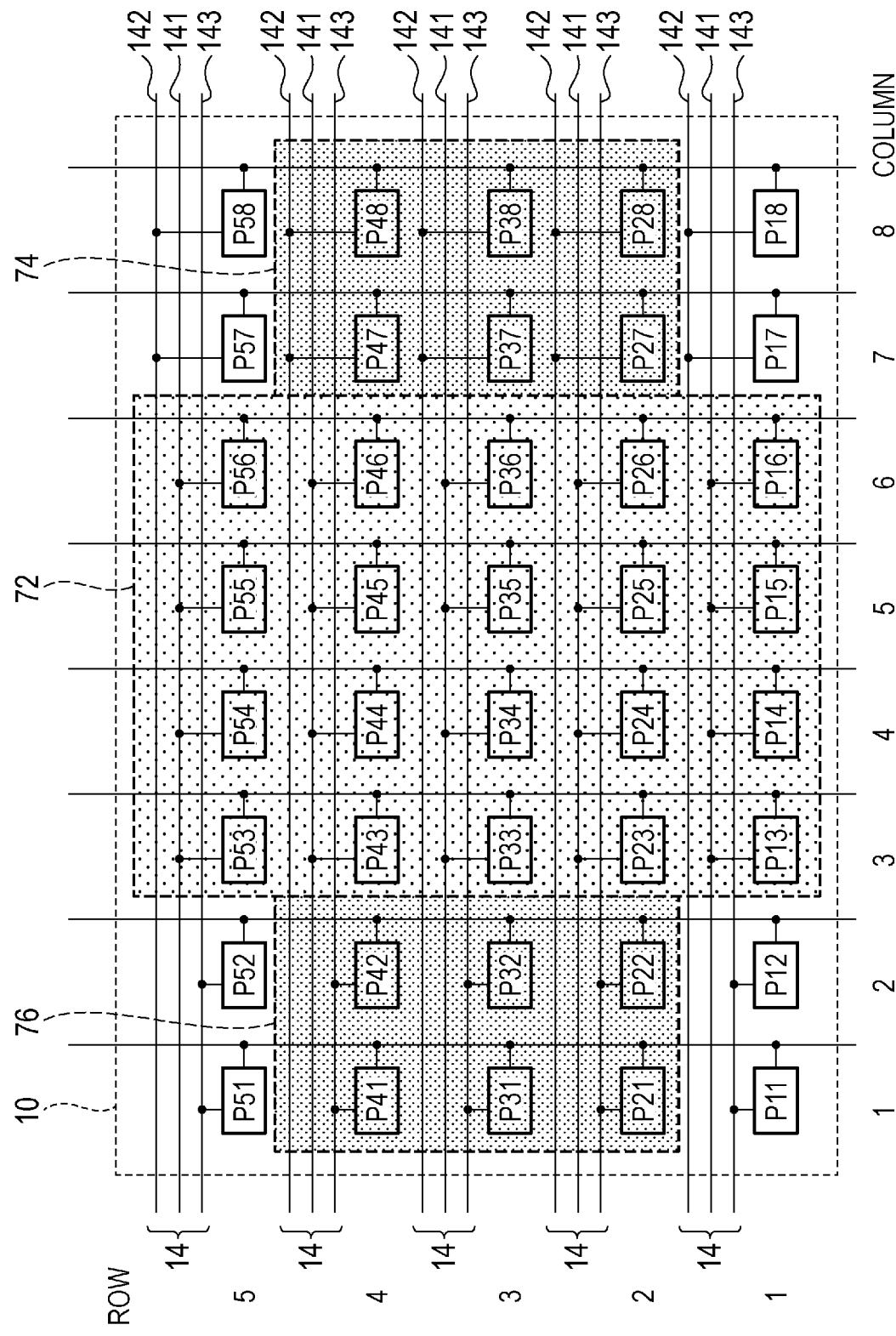
FIG. 6 is a diagram illustrating a configuration example of a pixel region of the photoelectric conversion device according to the second embodiment.

A photoelectric conversion device and a method of driving the same according to a second embodiment of the present invention will be described with reference to FIG. 4A to FIG. 6. Components similar to those of the photoelectric conversion device and the drive method thereof according to the first embodiment illustrated in FIG. 1 to FIG. 3C are labeled with the same reference, and the description thereof will be omitted or simplified. FIG. 4A to FIG. 4C are schematic diagrams illustrating the photoelectric conversion device and the method of driving the same according to the present embodiment. FIG. 5 is a block diagram illustrating a configuration example of respective units of the photoelectric conversion device according to the present embodiment. FIG. 6 is a diagram illustrating a configuration example of a pixel region of the photoelectric conversion device according to the present embodiment.

In the present embodiment, another method of driving the photoelectric conversion device according to the first embodiment will be described. In the method of driving the photoelectric conversion device according to the present embodiment, pixel signals are separately read out from three readout regions (the first readout region 72, the second readout region 74, and a third readout region 76) defined within the pixel region 10, as illustrated in FIG. 4A. Each of the first readout region 72, the second readout region 74, and the third readout region 76 is formed of a block comprising a pixel array with continuous rows and columns. FIG. 4A illustrates an example with a case where the first readout region 72 is formed of a block comprising a pixel array of five rows by four columns, and each of the second readout region 74 and the third readout region 76 is formed of a block comprising a pixel array of three rows by two columns.

The first readout region 72 is a region of the third column to the sixth column on the first row to the fifth row. Here, the first row to the fifth row corresponding to positions in the vertical direction of the first readout region 72 is defined as a first vertical region, and the third column to the sixth column corresponding to positions in the horizontal direction of the first readout region 72 is defined as a first horizontal region.

The second readout region 74 is a region of the seventh column to the eighth column on the second row to the fourth row. Here, the second row to the fourth row corresponding to positions in the vertical direction of the second readout region 74 is defined as a second vertical region, and the seventh column to the eighth column corresponding to positions in the horizontal direction of the second readout region 74 is defined as a second horizontal region.

The third readout region 76 is a region of the first column to the second column on the second row to the fourth row. Here, the first column to the second column corresponding to positions in the horizontal direction of the third readout region 76 is defined as a third horizontal region. The second row to the fourth row corresponding to positions in the vertical direction of the third readout region 76 are the same as the second vertical region of the second readout region 74.

As illustrated in FIG. 4A, while there is no overlapping part among the first horizontal region, the second horizontal region, and the third horizontal region, there is an overlapping part between the first vertical region and the second vertical region. That is, all the first readout region 72, the second readout region 74, and the third readout region 76 include the second row to the fourth row.

FIG. 4B is a diagram illustrating the positional relationship among the first readout region 72, the second readout region 74, and the third readout region 76 in the pixel region 10. The first readout region 72 is arranged such that the center thereof matches the center of the pixel region 10. The first readout region 72 is larger than each of the second readout region 74 and the third readout region 76. Further, the second readout region 74 and the third readout region 76 are arranged so as to be symmetrical with respect to a line in the vertical direction (up-down direction in FIG. 4B) passing through the center of the pixel region 10. The first readout region 72 is adjacent to the second readout region 74 and the third readout region 76.

FIG. 4C is a conceptual diagram illustrating the order of the output signals SOUT in a temporal manner that are output from the photoelectric conversion device 100. In this example, pixel signals of the pixels P of the first readout region 72 is selectively read out first, pixel signals of the pixels P of the second readout region 74 are then selectively readout, and pixel signals of the pixels P of the third readout region 76 are then selectively readout. In this case, output signals are output from the photoelectric conversion device 100 in the order of S13, S14, ..., S16, S23, ..., S56, S27, S28, S37, ..., S48, S21, S31, ..., and S42.

FIG. 5 is a block diagram illustrating a configuration example of the photoelectric conversion device 100 for implementing the drive method of FIG. 4A to FIG. 4C. In FIG. 5, illustration of the pixels P in the pixel region 10 is omitted, and only the first readout region 72, the second readout region 74, and the third readout region 76 are illustrated. The row select circuit 20 has a first row select circuit 22, a second row select circuit 24, and a third row select circuit 26. Each of the first row select circuit 22, the second row select circuit 24, and the third row select circuit 26 has a function of a vertical scanning circuit. Further, the column select circuit 40 has a first column select circuit 42, a second column select circuit 44, and a third column select circuit 46. Each of the first column select circuit 42, the second column select circuit 44, and the third column select circuit 46 has a function of a horizontal scanning circuit.

The first row select circuit 22 is a pixel control unit that controls the exposure period or the readout operation of pixel signals of the pixels P belonging to the first readout region 72 on a row basis. The second row select circuit 24 is a pixel control unit that controls the exposure period or the readout operation of pixel signals of the pixels P belonging to the second readout region 74 on a row basis. The third row select circuit 26 is a pixel control unit that controls the exposure period or the readout operation of pixel signals of the pixels P belonging to the third readout region 76 on a row basis.

The first column select circuit 42 is a signal processing unit that sequentially selects columns belonging to the first readout region 72 and outputs pixel signals. The second column select circuit 44 is a signal processing unit that sequentially selects columns belonging to the second readout region 74 and outputs pixel signals. The third column select circuit 46 is a signal processing unit that sequentially selects columns belonging to the third readout region 76 and outputs pixel signals.

FIG. 6 is a schematic diagram illustrating an example of the connection relationship between the row select circuit 20 and the pixels P. As illustrated in FIG. 6, the control line 14 on each row includes a set of three control lines 141, 142, and 143 corresponding to the number of readout regions. The control line 141 is the control line 14 connected to the pixels P belonging to the first readout region 72. The control line 141 is connected to the first row select circuit 22 and supplied with various control signals used for driving the pixels P from the first row select circuit 22. The control line 142 is the control line 14 connected to the pixels P belonging to the second readout region 74. The control line 142 is connected to the second row select circuit 24 and supplied with various control signals used for driving the pixels P from the second row select circuit 24. The control line 143 is the control line 14 connected to the pixels P belonging to the third readout region 76. The control line 143 is connected to the third row select circuit 26 and supplied with various control signals used for driving the pixels P from the third row select circuit 26.

With such a configuration of the row select circuit and the column select circuit 40, it is possible to independently control the pixels P belonging to the first readout region 72, the pixels P belonging to the second readout region 74, and the pixels P belonging to the third readout region 76. Further, it is possible to separately output pixel signals of the pixels P belonging to the first readout region 72, pixel signals of the pixels P belonging to the second readout region 74, and pixel signals of the pixels P belonging to the third readout region 76. Thereby, a readout region on which processing of an output signal is intended to be performed with priority can be initially read out, which enables faster processing.

Further, with a focus detection device being configured using the photoelectric conversion device according to the present embodiment, it is possible to increase the focus detection speed while improving the focus detection accuracy. For example, at least a pair of focus detection regions that output focus detection signals including parallax information are arranged in any of the plurality of readout regions. By reading out this readout region earlier than other readout regions, it is possible to shorten the time before the completion of the readout of signals used for focus detection and start focus detection calculation at an earlier timing compared to the case where all the pixels P are read out sequentially on a row basis. This enables quick feedback to automatic focus adjustment of the image capture lens or the like.

Note that, while the row select circuit 20 and the column select circuit 40 are formed of three circuits, respectively, when the row select circuit 20 and the column select circuit 40 are assumed to be configured using a shift resistor in the example of FIG. 5, the row select circuit 20 and the column select circuit 40 may be formed of a single circuit by using a decoder, respectively.

In the present embodiment, the row select circuit 20 and the column select circuit 40 are configured to be able to selectively read out pixel signals of the pixels P of three designated readout regions within the pixel region and output the pixel signals from the photoelectric conversion device 100 in a temporal manner on a readout region basis. In general, since a capturing object is more frequently captured near the center of the frame in the imaging device, the arrangement of the first readout region 72, the second readout region 74, and the third readout region 76 as described above is suitable for signal processing of electronic zooming or the like. Further, the symmetry of the second readout region 74 and the third readout region 76 is suitable for signal processing of automatic focus detection or automatic exposure detection, for example. Further, since respective readout regions are neighbored at the boundary thereof, there is no need for a circuit such as dummy or a layout region in the column select circuit 40, which allows for a simple configuration.

As discussed above, according to the present embodiment, flexibility in setting of readout regions within a pixel region and controllability of readout on a readout region basis can be improved, which enables faster readout of pixels in a particular readout region.

Third Embodiment

Figure 7:
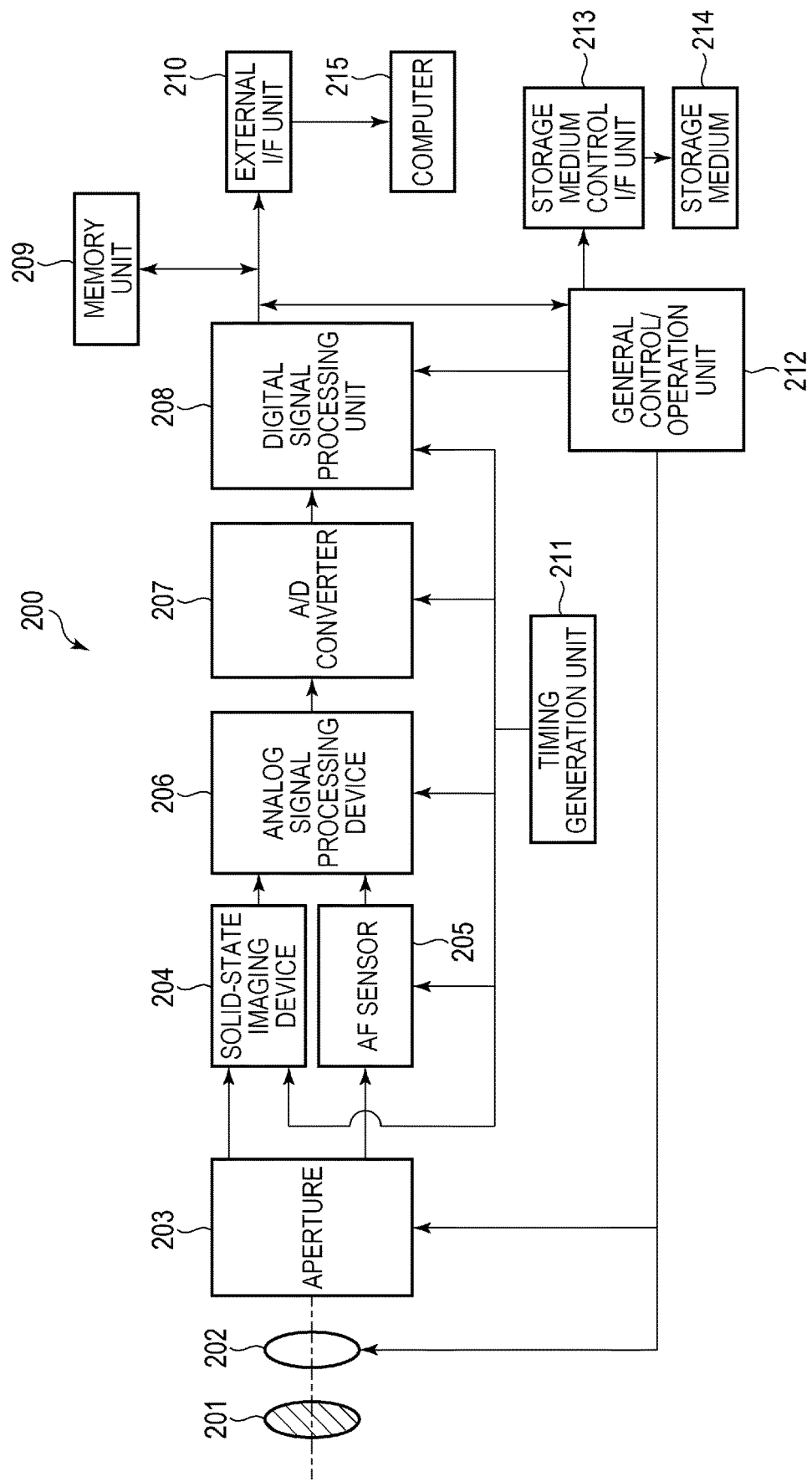
FIG. 7 is a block diagram illustrating a general configuration of an imaging system according to a third embodiment.

An imaging system according to a third embodiment of the present invention will be described with reference to FIG. 7. Components similar to those of the photoelectric conversion devices according to the first and second embodiments illustrated in FIG. 1 to FIG. 6 are labeled with the same reference, and the description thereof will be omitted or simplified. FIG. 7 is a block diagram illustrating a configuration example of the imaging system according to the present embodiment.

As illustrated in FIG. 7, an imaging system 200 according to the present embodiment has a barrier 201, a lens 202, an aperture 203, a solid-state imaging device 204, and an AF sensor 205. The lens 202 is an optical system for capturing an optical image of an object. The barrier 201 protects the lens 202. The aperture 203 adjusts the light amount of a light passing through the lens 202. The solid-state imaging device 204 acquires an optical image of an object captured by the lens 202 as an image signal. The AF sensor 205 is a focus detection device configured using the photoelectric conversion device 100 described in the second embodiment.

The imaging system 200 further has an analog signal processing device 206, an A/D converter 207, and a digital signal processing unit 208. The analog signal processing device 206 processes signals output from the solid-state imaging device 204 and the AF sensor 205. The A/D converter 207 performs analog-to-digital conversion on a signal output from the analog signal processing device 206. The digital signal processing unit 208 performs various correction on image data output from the A/D converter 207 or performs a process of compressing data.

The imaging system 200 further has a memory unit 209, an external I/F circuit 210, a timing generation unit 211, a general control/operation unit 212, and a storage medium control I/F unit 213. The memory unit 209 temporarily stores image data. The external I/F circuit 210 communicates with an external device such as an external computer 215. The timing generation unit 211 outputs various timing signals to the digital signal processing unit 208 or the like. The general control/operation unit 212 controls various calculation and the entire camera. The storage medium control I/F unit 213 exchanges data with a removable storage medium 214 such as a semiconductor memory used for storing the acquired image data or performing readout of image data.

When the barrier 201 is opened, an optical image from an object enters the AF sensor 205 via the lens 202 and the aperture 203. The general control/operation unit 212 calculates the distance to an object by using the above-described phase difference detection based on an output signal from the AF sensor 205. The general control/operation unit 212 then performs autofocus control to drive the lens 202 based on a calculation result, again determine whether or not focused on an imaging plane, and again drive the lens 202 when determined to be out of focus.

Subsequently, after confirmed to be focused, a charge accumulation operation by the solid-state imaging device 204 is started. Upon the completion of the charge accumulation operation of the solid-state imaging device 204, an image signal output from the solid-state imaging device 204 is subjected to a predetermined process in the analog signal processing device 206 and then digitally converted by the A/D converter 207. The digitally converted image signal is written to the memory unit 209 by the general control/operation unit 212 via the digital signal processing unit 208.

Then, data accumulated in the memory unit 209 is stored in the storage medium 214 via the storage medium control I/F unit 213 by the general control/operation unit 212. Alternatively, data accumulated in the memory unit 209 may be input directly to the external computer 215 via the external I/F circuit 210.

As described in the first and second embodiments, by configuring the AF sensor 205 using the photoelectric conversion device 100 illustrated in any of the above embodiments, it is possible to increase the focus detection speed while improving the focus detection accuracy. Therefore, according to the imaging system of the present embodiment using such the AF sensor 205, a higher-definition image can be acquired quickly.

MODIFIED EMBODIMENTS

The present invention is not limited to the above-described embodiments, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention.

Further, in the photoelectric conversion devices 100 in the first and second embodiments, the pixel circuit forming each of the pixels P is not limited to that illustrated in FIG. 2. For example, the pixel P is not necessarily required to have the configuration supporting a global electronic shutter operation, and the transfer transistor M2 and the overflow transistor M6 may not be provided. In this case, charges accumulated in the photoelectric converter PD are transferred from the transfer transistor M1 to the FD portion (holding portion C2).

Further, while an example of the photoelectric conversion device in which two or three readout regions are defined within the pixel region 10 has been described in the first and second embodiments, the number of readout regions defined within the pixel region 10 is not limited in particular.

Further, the imaging system illustrated in the third embodiment described above illustrates an example of an imaging system to which the photoelectric conversion device of the present invention can be applied, imaging systems to which the photoelectric conversion device of the present invention can be applied is not limited to the configuration illustrated in FIG. 7. The intended use of the photoelectric conversion device is not limited to the AF sensor, but also can be applied to an AE sensor or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-089437, filed Apr. 28, 2017, which is hereby incorporated by reference herein in its entirety.

What is claimed is:

1. A photoelectric conversion device comprising:
a pixel region in which a plurality of pixels each including a photoelectric converter are arranged to form a plurality of rows and a plurality of columns;
a plurality of control lines each connected to the pixels arranged on a corresponding row of the plurality of rows;
a plurality of output lines each connected to the pixels arranged on a corresponding column of the plurality of columns;
a pixel control unit connected to the plurality of control lines and configured to supply control signals to control the pixels for the plurality of control lines; and
a signal processing unit connected to the plurality of output lines and configured to select a signal output to the plurality of output lines and output the selected signal,
wherein the pixel region includes a plurality of readout regions each comprising a block of the pixels arranged on consecutive rows and on consecutive columns,
wherein at least one row of the plurality of rows includes both of the pixel of the block forming a first readout region of the plurality of readout regions and the pixel of the block forming a second readout region of the plurality of readout regions,
wherein the signal processing unit is configured to output signals of the pixels in a corresponding block sequentially for each of the readout regions,
wherein the pixel control unit is configured to read out a signal of each of the pixels of the block forming the second readout region to a corresponding output line after reading out a signal of each of the pixels of the block forming the first readout region to the corresponding output line, and
wherein, between a readout operation of signals of the pixels of the block forming the first readout region, which are arranged on the at least one row, and a readout operation of signals of the pixels of the block forming the second readout region, which are arranged on the at least one row, the pixel control unit and the signal processing unit read out signals of the pixels of the block forming the first readout region, which are arranged on a row other than the at least one row.

2. The photoelectric conversion device according to claim 1, wherein the pixel control unit and the signal processing unit are configured to be able to switch readout order of the plurality of readout regions.

3. The photoelectric conversion device according to claim 1, wherein, out of the plurality of readout regions, a readout region which is initially read out is a readout region including the center of the pixel region.

4. The photoelectric conversion device according to claim 1, wherein the plurality of readout regions include first readout region including the center of the pixel region, and the second readout region and a third readout region arranged in symmetrical positions with respect to the center of the pixel region.

5. The photoelectric conversion device according to claim 4, wherein the first readout region is wider than each of the second readout region and the third readout region.

6. The photoelectric conversion device according to claim 4, wherein the first readout region neighbors the second readout region and the third readout region at respective boundaries.

7. The photoelectric conversion device according to claim 1, wherein the control lines are arranged on each of the rows, the number of the control lines being in accordance with the number of the readout regions.

8. The photoelectric conversion device according to claim 1, wherein the pixel control unit includes a plurality of first scanning circuits associated with each of the plurality of readout regions.

9. The photoelectric conversion device according to claim 1, wherein the signal processing unit includes a plurality of second scanning circuits associated with each of the plurality of readout regions.

10. A method of driving a photoelectric conversion device that includes a pixel region including a plurality of pixels arranged to form a plurality of rows and a plurality of columns and each including a photoelectric converter, a plurality of control lines provided on respective ones of the plurality of rows and each connected to the pixels arranged on a corresponding row of the plurality of rows, and a plurality of output lines provided on respective ones of the plurality of columns and each connected to the pixels arranged on a corresponding column of the plurality of columns, wherein a plurality of readout regions each formed of a block of the pixels arranged on consecutive rows and on consecutive columns are defined in the pixel region in which two or more of the readout regions are arranged on at least one row of the plurality of rows, a pixel control unit connected to the plurality of control lines and configured to supply control signals to control the pixels for the plurality of control lines, and a signal processing unit connected to the plurality of output lines and configured to select a signal output to the plurality of output lines and output the selected signal the method comprising:
scanning the control lines to read out a signal of each of the pixels of the block forming a first readout region to a corresponding output line;
scanning, after reading out the signals of the pixels of the block forming the first readout region, the control lines to read out a signal of each of the pixels of the block forming a second readout regions to a corresponding output line, and scanning the output lines associated with the readout regions and outputting signals of the pixels in a corresponding block sequentially for each of the readout regions, wherein, between a readout operation of signals of the pixels of the block forming the first readout region, which are arranged on the at least one row, and a readout operation of signals of the pixels of the block forming the second readout region, which are arranged on the at least one row, the pixel control unit and the signal processing unit read out signals of the pixels of the block forming the first readout region, which are arranged on a row other than the at least one row.

11. The method of driving the photoelectric conversion device according to claim 10, wherein the plurality of readout regions include the first readout region including the center of the pixel region, and the second readout region and a third readout region arranged in symmetrical positions with respect to the center of the pixel region, and wherein, out of the plurality of readout regions, a readout region which is initially read out is the first readout region.

12. An imaging system comprising:

the photoelectric conversion device according to claim 1;

a solid-state imaging device that outputs an optical image of an object as an image signal;

a calculation unit that calculates a distance to the object based on an output signal of the photoelectric conversion device; and a control unit that, based on the distance calculated by the calculation unit, outputs a control signal that controls an optical system so that the optical image of the object is focused on an imaging plane of the solid-state imaging device.

* * * * *